United States Patent [19]

Gutekunst et al.

[11] 4,216,304

[45] Aug. 5, 1980

[54] MIXTURE CONTAINING A POLYGLYCIDYL ETHER AND A DIHYDRIC PHENOL AND THE USE THEREOF FOR THE PREPARATION OF PLASTICS

[75] Inventors: Ferdinand Gutekunst, Riehen; Friedrich Lohse, Oberwil; Rolf Schmid, Gelterkinden, all of Switzerland

[73] Assignee: Ciba-Geigy Corporation, Ardsley, N.Y.

[21] Appl. No.: 47,952

[22] Filed: Jun. 11, 1979

[30] Foreign Application Priority Data

Jun. 22, 1978 [CH] Switzerland .......................... 6819/78

[51] Int. Cl.² .................... C08G 8/36; C08G 59/14
[52] U.S. Cl. ........................ 528/94; 525/507; 528/93; 528/104; 528/107
[58] Field of Search .................. 528/93, 94, 95, 104, 528/107; 525/507

[56] References Cited

U.S. PATENT DOCUMENTS

| | | | |
|---|---|---|---|
| 3,294,865 | 12/1966 | Price | 260/837 |
| 3,477,990 | 11/1969 | Dante et al. | 260/47 |
| 3,493,630 | 2/1970 | Salensky | 260/831 |
| 3,824,212 | 7/1974 | Sinnema et al. | 260/47 EP |

FOREIGN PATENT DOCUMENTS 1016523  1/1966  United Kingdom .

OTHER PUBLICATIONS

Nikolaev et al., "Adhesive", Chemical Abstracts 83, 60523w (1975).

*Primary Examiner*—Earl A. Nielsen
*Attorney, Agent, or Firm*—Joseph F. DiPrima; Harry Falber

[57] ABSTRACT

A liquid mixture of a glycidyl ether of a phenol novolac with, on average, more than 2 glycidyl groups in the molecule and a dihydric phenol in approximately equivalent amounts. The mixture is used to prepare cured hydrolysis-resistant plastics by casting the resin mixture or laminating, impregnating or bonding substrates.

6 Claims, No Drawings

MIXTURE CONTAINING A POLYGLYCIDYL ETHER AND A DIHYDRIC PHENOL AND THE USE THEREOF FOR THE PREPARATION OF PLASTICS

The invention relates to a mixture which contains a polyglycidyl ether and, as the curing agent, a dihydric phenol and is used as a casting, laminating or impregnating resin and as a resin adhesive, and also to a process for the preparation of plastics from this mixture and to the plastics based on epoxide resin which are prepared therewith.

The reaction of tris-(glycidyloxyphenyl)-propane with polyhydric phenols in the presence of an alkaline catalyst is known from German Auslegeschrift No. 1,030,021. The starting mixture consists of a solid, glassy mass which cannot be used as a coating resin or laminating resin.

The preparation of plastics from mixtures of polyepoxide compounds with polyhydric phenols which contain ester groupings is known from U.S. Pat. No. 3,032,527. Products of this type have low stability to hydrolysis.

The mixtures of diglycidyl ethers of bisphenol A and phenol novolacs which are described in U.S. Pat. No. 3,264,369 are also glassy, solid products which have to be dissolved for use.

Mixtures of phenol novolac polyglycidyl ethers and phenol novolacs, such as are described in German Pat. No. 1,152,255, are likewise hard and brittle and cannot be cast.

The curing of phenol novolac polyglycidyl ethers with dihydric phenols is described in "Handbook of Epoxy Resins by H. Lee and K. Neville, McGraw-Hill, 1967" on page 11-13. The castings produced in this way do indeed have good flexural strength and impact strength immediately after production and after storing at room temperature, but after storing in water at relatively high temperatures these characteristics fall back to such low values (c.f. the comparison example) that the products are no longer suitable for certain purposes, for example pipes and containers for hot water.

The mixtures according to the invention are liquid at room temperature and after curing give flexible, impact-resistant plastics which are resistant to heat distortion and to hydrolysis.

The liquid mixture, according to the invention, of curable epoxide resin, a curing agent for the resin and a curing accelerator comprises (a) as the resin, a glycidyl ether of a phenol novolac, which is liquid at room temperature, is free from ester groups and contains, on average, more than 2 glycidyl groups in the molecule and has an epoxide equivalent weight of 150 to 300 and (b) as the curing agent, 2,6-dihydroxytoluene, there being 0.5 to 1.1 equivalents of (b) per 1 equivalent of (a).

Curing accelerators are tertiary amines, for example imidazoles, for example 1-methylimidazole, quaternary ammonium salts, for example tetramethylammonium chloride, or alkali metal alcoholates, for example sodium ethylate.

A proportion of the curing agent can be replaced by a halogenated dihydric phenol, for example by tetrabromobiphenol A; this renders the product flame retardant.

In order to prepare the mixture, the resin component and the curing agent component are preferably heated to a temperature such that the curing agent readily dissolves in the liquid resin, i.e. to temperatures of up to 150° C., after which, after cooling, the curing accelerator is added. Tetramethylammonium chloride is preferably admixed in the form of an aqueous solution, for example a 10 percent by weight solution, and the mixture is de-aerated and dehydrated in vacuo before it is cured by heating, if desired after pouring into warmed moulds, after casting on films or sheets or after impregnating layers of fibre. The curing time is a few minutes up to two days, depending on the temperature. The temperature varies from 120° C. to 220° C.

The cured products have a high impact strength, good stability to heat (compared with the amine-cured systems) and high stability to hydrolysis (compared with the anhydride-cured systems). In view of the high crosslinking density in a network built up predominantly of aromatic structural units, the high flexibility and impact strength are surprising. The high flexural and impact strengths after long-term storage at high temperature in water are also surprising.

EXAMPLE 1

180 g (1.0 equivalent) of a glycidylated phenol novolac with an epoxide equivalent of 5.56 equivalents/kg are mixed at 110°-120° C. with 55.8 g (0.9 equivalent) of 2,6-dihydroxytoluene; after cooling, 0.24 g of 1-methylimidazole is mixed in. The mixture is briefly freed from air which has been stirred in, and moisture, under about 2 kPa in a vacuum cabinet. The reaction mixture is poured into a pre-warmed mould which is made of an aluminum alloy containing magnesium and silicon and has dimensions of 15×15×4 and 15×15×1 mm and cured for 16 hours at 160° C. The following characteristics are measured for the cured moulded sheets:

| | | | |
|---|---|---|---|
| Flexural strength (according to VSM 77103) | = | 148 | N/mm$^2$ |
| Deflection (according to VSM 77103) | = | 17.2 | mm |
| Impact strength (according to VSM 77105) | = | 58 | N.mm/mm$^2$ |
| Heat distortion point (according to ISO R 75) | = | 110 | °C. |
| Absorption of water after 4 days at 23° C. | = | 0.33 | % |
| Absorption of water after 220 days at 100° C. | = | 4 | % |
| Flexural strength (according to VSM 77103) after 220 days at 100° C. in water | = | 120 | N/mm$^2$ |
| Deflection (according to VSM 77103) after 220 days at 100° C. in water | = | 8 | mm |
| Impact strength (according to VSM 77105) after 220 days at 100° C. in water | = | 48 | N.mm/mm$^2$ |

COMPARISON EXAMPLE 180 g (1.0 equivalent) of a glycidylated phenol novolac with an epoxide equivalent of 5.56 equivalents/kg are mixed with 49.5 g (0.9 equivalent) of 1,3-dihydroxybenzene at 110°-120° C. After cooling, 2.3 g of a 10% aqueous solution of tetramethylammonium chloride are mixed in. The mixture is subjected to a vacuum and is then poured into a pre-warmed mould made of an aluminum alloy. After heat treatment for 16 hours at 180° C., moulded sheets with the following characteristics are obtained:

| | | | |
|---|---|---|---|
| Flexural strength (according to VSM 77103) | = | 150 | N/mm$^2$ |
| Deflection (according to VSM 77103) | = | 12.8 | mm |
| Impact strength (according to VSM 77105) | = | 69 | N.mm/mm$^2$ |
| Heat distortion point (according to ISO R 75) | = | 106 | °C. |
| Absorption of water after 4 days at 23° C. | = | 0.25 | % |
| Absorption of water after 220 days at 100° C. | = | 4 | % |
| Flexural strength (according to VSM 77103) after 220 days at 100° C. in water | = | 50 | N/mm$^2$ |
| Deflection (according to VSM 77103) after 220 days at 100° C. in water | = | 3 | mm |
| Impact strength (according to VSM 77105) after 220 days at 100° C. in water | = | 5 | N.mm/mm$^2$ |

The comparison example shows that, in contrast to a product obtained from a mixture according to the invention, a polymer which is built up in a similar way and has approximately the same initial values has only a fraction of the strength and flexibility (deflection, impact strength) after storing in water at 100° C. for 220 days.

EXAMPLE 2

180 g (1.0 equivalent) of a glycidylated phenol novolac with an epoxide content of 5.56 equivalents/kg are mixed with 55.8 g (0.9 equivalent) of 2,6-dihydroxytoluene at 110° to 120° C.; after cooling, 0.24 g (0.1%) of 2-ethyl-4-methylimidazole is mixed in. The mixture is processed and cured as in Example 1. The following characteristics are measured on the moulded sheets:

| | |
|---|---|
| Flexural strength (VSM 77103) before storage | =143 N/mm$^2$ |
| Flexural strength (VSM 77103) after storing in boiling water for 30 days | =99 N/mm$^2$ |
| Deflection (VSM 77103) before storage | =13.3 mm |
| Deflection (VSM 77103) after storing in boiling water for 30 days | =4.8 mm |
| Impact strength (VSM 77105) before storage | =47 N.mm/mm$^2$ |
| Impact strength (VSM 77105) after storing in boiling water for 30 days | =24 N.mm/mm$^2$ |
| Heat distortion point (ISO R 75) | =109° C. |
| Absorption of water after storing in water at 23° C. for 4 days | =0.26% |
| Absorption of water after storing in water at 100° C. for 30 days | =3.5% |

EXAMPLE 3

175 g (1.0 equivalent) of a glycidylated phenol novolac with an epoxide content of 5.7 equivalents/kg are mixed with 55.8 g (0.9 equivalent) of 2,6-dihydroxytoluene at 110° C.; after cooling, 0.23 g (0.1%) of benzyldimethylamine is mixed in. The mixture is processed and cured as in Example 1. The following characteristics are measured on the moulded sheets:

| | |
|---|---|
| Flexural strength (VSM 77103) before storage | =140 N/mm$^2$ |
| Flexural strength (VSM 77103) after storing in boiling water for 30 days | =111 N/mm$^2$ |
| Deflection (VSM 77103) before storage | =18.3 mm |
| Deflection (VSM 77103) after storing in boiling water for 30 days | =7.7 mm |
| Impact strength (VSM 77105) before storage | =62 N.mm/mm$^2$ |
| Impact strength (VSM 77105) after storing in boiling water for 30 days | =41 N.mm/mm$^2$ |
| Heat distortion point (ISO R75) | =89° C. |
| Absorption of water after storing in water at 23° C. for 4 days | =0.23% |
| Absorption of water after storing in water at 100° C. for 30 days | =3.5% |

EXAMPLE 4

175 g (1.0 equivalent) of a glycidylated phenol novolac with an epoxide content of 5.7 equivalents/kg are mixed with 68.2 g (1.1 equivalents) of 2,6-dihydroxytoluene at 120° C.; after cooling, 0.48 g (0.2%) of a compound of the formula $(CH_3)_2N(CH_2)_3NH(CH_2)_2CN$ is mixed in. The mixture is processed and cured as in Example 1. The following characteristics are measured on the moulded sheets:

| | |
|---|---|
| Flexural strength (VSM 77103) before storage | =154 N/mm$^2$ |
| Flexural strength (VSM 77103) after storing in boiling water for 30 days | =95 N/mm$^2$ |
| Flexural strength (VSM 77103) after storing in boiling water for 60 days | =96 N/mm$^2$ |
| Deflection (VSM 77103) before storage | =19.3 mm |
| Deflection (VSM 77103) after storing in boiling water for 30 days | =3.5 mm |
| Deflection (VSM 77103) after storing in boiling water for 60 days | =3.4 mm |
| Impact strength (VSM 77105) before storage | =19 N.mm/mm$^2$ |
| Impact strength (VSM 77105) after storing in boiling water for 30 days | =14 N.mm/mm$^2$ |
| Impact strength (VSM 77105) after storing in boiling water for 60 days | =13 N.mm/mm$^2$ |
| Heat distortion point (ISO R 75) | =90° C. |
| Absorption of water after storing in water at 23° C. for 4 days | =0.18% |
| Absorption of water after storing in water at 100° C. for 30 days | =3.5% |
| Absorption of water after storing in water at 100° C. for 60 days | =3.6% |
| Flexural strength after storing in water at 140° C. for 60 days | =50 N/mm$^2$ |
| Deflection after storing in water at 140° C. for 60 days | =2.0 mm |
| Impact strength after storing in water at 140° C. for 60 days | =2 N.mm/mm$^2$ |
| Absorption of water after storing in water at 140° C. for 60 days | =4.8% |

If 1% of a 10% aqueous solution of tetramethylammonium chloride is used in place of the 0.2% of the tertiary amine, mouldings which have virtually the same characteristics are obtained.

What is claimed is:

1. A liquid mixture of a curable epoxide resin, a curing agent for the resin and a curing accelerator, which comprises
   (a) as the resin, a glycidyl ether of a phenol novolac, which is liquid at room temperature, is free from ester groups and contains, on average, more than 2 glycidyl groups in the molecule and has an epoxide equivalent weight of 150 to 300 and
   (b) as the curing agent, 2,6-dihydroxytoluene, there being 0.5 to 1.1 equivalents of (b) per 1 equivalent of (a).

2. A mixture according to claim 1, which contains, as the curing accelerator (c), a tertiary amine, an imidazole, a quaternary ammonium salt or an alkali metal alcoholate.

3. A mixture according to claim 1, in which there is 0.9 to 1.0 equivalent of component (b) per 1 equivalent of component (a).

4. A mixture according to claim 3, which comprises as the component (a) a glycidylated phenol novolac with an epoxide equivalent of 5.56 equivalents/kg, as the component (b) 0.9 equivalent of 2,6-dihydroxytoluene per 1 equivalent of (a), and as the component (c) 0,1 g of 1-methylimidazole per 100 g of (a) and (b).

5. A process for the preparation of a plastic based on epoxide resin, which comprises allowing a mixture according to any one of claims 1 to 3 to react at a temperature above 120° C.

6. A plastic based on epoxide resin, which has been prepared from a mixture according to any one of claims 1 to 3.

* * * * *